United States Patent [19]

Leung

[11] 4,235,747
[45] Nov. 25, 1980

[54] PROCESS FOR IMPROVING POLYMERIZATION PERFORMANCE OF BROWN SOLID TITANIUM TRICHLORIDE CATALYST COMPONENT

[75] Inventor: Linus K. Leung, Naperville, Ill.

[73] Assignee: Standard Oil Company (Indiana), Chicago, Ill.

[21] Appl. No.: 31,378

[22] Filed: Apr. 19, 1979

[51] Int. Cl.³ .............................................. C08F 4/64
[52] U.S. Cl. ................................ 252/429 B; 526/139; 526/140; 526/141; 526/142; 526/149
[58] Field of Search ...................................... 252/429 B

[56] References Cited

U.S. PATENT DOCUMENTS

| | | |
|---|---|---|
| 2,936,302 | 5/1960 | Jones et al. . |
| 2,956,994 | 10/1960 | Peterlein . |
| 2,976,253 | 3/1961 | Edwards ............................ 252/430 |
| 2,990,399 | 6/1961 | Peterlein . |
| 3,035,037 | 5/1962 | Rinotorff et al. . |
| 3,062,801 | 11/1962 | Hoeg et al. . |
| 3,067,183 | 12/1962 | Hagemeyer et al. . |
| 3,272,788 | 9/1966 | Dietz . |
| 3,275,613 | 9/1966 | Emrick et al. . |
| 3,365,436 | 1/1968 | Ourgaud . |
| 3,514,501 | 5/1970 | Leibson et al. . |
| 3,780,136 | 12/1973 | Khelghatian et al. . |
| 3,893,989 | 7/1975 | Leicht et al. ................. 260/878 B X |
| 3,950,268 | 4/1976 | Karayannis et al. . |
| 3,984,350 | 10/1976 | Karayannis et al. ............. 252/429 B |
| 4,072,809 | 2/1978 | Rogan . |
| 4,086,185 | 4/1978 | Shirai et al. ...................... 252/429 B |
| 4,111,836 | 9/1978 | Karayannis et al. ............. 252/429 B |

FOREIGN PATENT DOCUMENTS

| | | |
|---|---|---|
| 51-10398 | 7/1976 | Japan . |
| 1444009 | 7/1976 | United Kingdom . |
| 1444010 | 7/1976 | United Kingdom . |

*Primary Examiner*—Patrick Garvin
*Attorney, Agent, or Firm*—Stephen L. Hensley; William T. McClain; William H. Magidson

[57] ABSTRACT

Polymerization performance of organoaluminum reduced, electron donor complexed, brown solid, beta titanium trichloride catalyst component is improved in terms of polymer particle size by contacting said brown solid with at least one aluminum alkyl and at least one alpha-olefin in amounts and under conditions such that a low yield, polyalphaolefin structure is formed around the brown solid.

26 Claims, No Drawings

PROCESS FOR IMPROVING POLYMERIZATION PERFORMANCE OF BROWN SOLID TITANIUM TRICHLORIDE CATALYST COMPONENT

BACKGROUND OF THE INVENTION

This invention relates to catalyst components for the polymerization of alpha-olefins, and more particularly, to a method for improving the polymerization performance of organoaluminum reduced, electron donor complexed, brown solid beta titanium trichloride compositions in terms of polymer particle size.

Commonly assigned U.S. Pat. Nos. 3,984,350 (Karayannis et al.), 4,111,836 (Karayannis et al.), and application Ser. No. 892,663 (filed Apr. 3, 1978, in the name of Nicholas M. Karayannis and Harold Grams) disclose high surface area, large pore volume brown solid catalyst components comprising beta titanium trichloride and an amount, ranging up to about 10 mole percent, of at least one electron pair donor, such brown solid catalyst components being prepared by reducing titanium tetrachloride with an organoaluminum component followed by complexing the reduced solid with at least one electron pair donor and treating the result with at least one electron pair acceptor. For purposes hereof, the brown solid catalyst components disclosed in the aforesaid patents and application are referred to as "organoaluminum reduced, electron donor complexed, brown solid, beta titanium trichloride."

When used in the polymerization of alpha-olefins, catalysts containing organoaluminum reduced, electron donor complexed, brown solid, beta titanium trichloride give highly desirable results in terms of activity and stereospecificity such that high yields of highly crystalline polymeric products are obtained. However, such brown solid titanium trichloride compositions, being somewhat fragile, are susceptible to substantial attrition during normal catalyst makeup and pumping operations as well as during polymerization such that decreases in the particle size of the brown solid often occur. Solid polymer produced in the presence of the attritted brown solid often is reduced in terms of particle size and bulk density. Additionally, attrition can lead to production of undesirably high levels of fine polymer particles. Polymer particle size, bulk density, and fines content are important from the standpoint of product quality because if particle size and/or bulk density are too low and/or levels of fines are too high, difficulties in handling and processing the polymeric products are encountered. Fines also are disadvantageous from the standpoint of process efficiency because they can accumulate in process lines and equipment to such an extent as to cause plugging.

In the vapor phase polymerization of alpha-olefins using catalysts containing organoaluminum reduced, electron donor complexed, brown solid, beta titanium trichloride a further difficulty is encountered due to the high activity of the catalysts. When catalyst is introduced into the vapor phase reactor, contact between gaseous alpha-olefin monomer and catalyst can lead to a violent, exothermic, initial polymerization reaction. Heat evolved due to this initial reaction often is sufficient to cause fusion of polymer into agglomerates. Formation of these agglomerates is undesirable from the standpoint of handling and processing of the polymeric product, and in addition, if large enough agglomerates form they can seriously hinder reactor performance.

It is an object of the present invention to provide a method for improving the alpha-olefin polymerization performance of organoaluminum reduced, electron donor complexed, brown solid, beta titanium trichloride catalyst components in terms of polymer particle size. A further object of the invention is to provide a method for improving such brown solid catalyst components in terms of resistance to attrition such that polyalphaolefins produced in the presence thereof are improved in terms of particle size, bulk density, and fines content. A further object of the invention is to provide a method for preparing a brown solid catalyst component which, when used in the polymerization of alpha-olefins, is essentially comparable to the brown solid catalyst components disclosed in U.S. Pat. Nos. 3,984,350 and 4,111,836, and application Ser. No. 892,663 in terms of overall activity but reduced in terms of initial activity such that high yields of polyalpha-olefins can be produced in vapor phase polymerization systems without substantial agglomerate formation. Other objects of the invention will be apparent to persons skilled in the art from the following description.

It has been found that the foregoing objects can be attained according to the present invention wherein the brown solid, beta titanium trichloride catalyst components of the aforesaid U.S. Pat. Nos. 3,984,350, 4,111,836, and application Ser. No. 892,663 are contacted with alpha-olefin monomer and aluminum alkyl catalyst component in amounts and under conditions such that a low yield polyalpha-olefin structure is formed around the brown solid catalyst component. The polyalpha-olefin structure surrounding the brown solid catalyst component protects the same from attrition during polymerization use such that substantial reductions in polymer particle size and bulk density are avoided. Further, although the plastic structure which encapsulates the brown solid has only minor effects on overall polymerization activity, initial activity is reduced such that on introduction into a vapor phase polymerization zone, violent exothermic polymerization and the accompanying agglomerate formation are reduced.

Heretofore it has been proposed to treat various titanium halide alpha-olefin polymerization catalyst components with aluminum alkyls and alpha-olefins for various purposes. However, these proposals do not disclose the process of the present invention wherein the polymerization performance of organoaluminum reduced, electron donor complexed, brown solid, beta titanium trichloride catalyst components prepared in accordance with U.S. Pat. Nos. 3,984,350, 4,111,836, and application Ser. No. 892,663 are improved in terms of polymer particle size by treatment of the brown solid, prior to polymerization use, with aluminum alkyls and alpha-olefins. For example, British Pat. No. 1,444,010 (Solvay) discloses that titanium trichloride compositions prepared by reduction of titanium trichloride with organoaluminum components followed by complexing with electron donors and treatment with titanium tetrachloride can be improved in terms of shelf life by preactivation treatment with organoaluminum compounds in an inert solvent with 10 hours of preparation. The titanium trichloride compositions to be preactivated according to this patent "may be, although they are not necessarily based on a $TiCl_3$ of violet colour, belonging to the delta crystalline form according to the classification generally adopted." As an optional feature of the invention, the patentee discloses that the titanium trichloride composition can be contacted with at least one alpha-olefin simultaneously with or subsequent to the organoaluminum preactivation. Contacting with alpha-olefin is conducted at −10° to 100° C. and 1–50 atmospheres for a period of time such that up to 1,000 parts by weight of polyalpha-olefin are formed per part by weight of the preactivated titanium trichloride composition. British Pat. No. 1,444,009 (Solvay) discloses the identical preactivation treatment and optional prepolymerization for titanium trichloride compositions having a surface area of at least 75 square meters per gram and a pore volume of at least 0.15 cc per gram and which "may be, although they are not necessarily, based on a $TiCl_3$ of violet colour, belonging to the delta crystalline form according to the classification generally adopted."

U.S. Pat. No. 4,086,185 (Shirai et al.) discloses that the polymerization performance of delta titanium trichloride compositions prepared by a variety of methods, including reduction of titanium tetrachloride with organoaluminum compounds followed by complexing with electron donors and treatment with titanium tetrachloride, can be improved in terms of stereospecificity by contacting the delta titanium trichloride composition, prior to polymerization use, with an alkylaluminum halide and propylene at 10° to about 50° C. to form 0.5 to 5 parts by weight polypropylene per part by weight delta titanium trichloride composition. To like effect is Japan Kokai No. 53-031787 (Chisso).

U.S. Pat. No. 3,893,989 (Liecht et al.) discloses that the alpha-olefin polymerization performance of violet titanium trichloride prepared by reduction of titanium tetrachloride with organoaluminum compounds can be improved in terms of particle size distribution by a staged polymerization wherein propylene is first polymerized in the presence of an aluminum alkyl catalyst component and the violet titanium trichloride at 15°–25° C. and then additional propylene is polymerized in the presence of the resulting slurry of polypropylene and catalyst at temperatures ranging from 40°–90° C.

Other prior art which may be of interest to the present invention in disclosing pretreatment of various alpha-olefin polymerization catalysts and/or catalyst components includes U.S. Pat. Nos. 2,936,302 (Jones et al.); 2,956,994 (Peterlein); 2,990,399 (Peterlein); 3,035,037 (Rindtorff et al.); 3,062,801 (Hoeg et al.); 3,067,183 (Hagemeyer et al.); 3,272,788 (Dietz); 3,275,613 (Emrick et al.); 3,365,436 (Ourgaud); 3,514,501 (Leibson et al.); and 3,780,136 (Khelghatian et al.). None of these patents, however, discloses application of the treatment to titanium trichloride compositions prepared by reduction of titanium tetrachloride with an organoaluminum component followed by complexing with electron donors and treatment with electron acceptors.

DESCRIPTION OF THE INVENTION

Briefly, the method of the present invention is a method for improving the alpha-olefin polymerization performance of high surface area, large pore volume, organoaluminum reduced, electron donor complexed, brown solid, beta titanium trichloride catalyst components in terms of polyalpha-olefin particle size comprising contacting such brown solid with at least one aluminum alkyl component and at least one alpha-olefin in amounts and under conditions such that a low yield polyalpha-olefin structure is formed around the brown solid. Optionally, one or more crystallinity promoting modifiers such as organic electron donors are included during the contacting with aluminum alkyl and alpha-olefin. The organoaluminum reduced, electron donor complexed brown solid catalyst components which are improved according to the method of this invention comprise beta titanium trichloride and an amount, ranging up to about 10 mole percent, of at least one electron pair donor compound and have a surface area of at least about 50 square meters per gram and a pore volume of at least about 0.10 cc per gram. The brown solid is prepared by a process comprising (a) reducing titanium tetrachloride with at least one organoaluminum component of the formula $AlR_nX_{3-n}$ wherein R is a hydrocarbyl radical, X is chlorine or bromine, and n is greater than 1 and less than or equal to 3 in amounts such that the molar ratio of organoaluminum component to titanium tetrachloride ranges from about 0.5:1 to about 3:1 and at a temperature below about 0° C. in the presence of an inert liquid solvent for the titanium tetrachloride to form a brown solid; (b) increasing the temperature of the brown solid produced in (a) to less than about 100° C.; (c) contacting the brown solid of (b) with at least one electron pair donor compound selected from the group consisting of hydrocarbyl ethers, thioethers, thiols, ketones, esters, amides, amines, phosphines, and stibines in the presence of an inert liquid solvent for said donor compound, the molar ratio of said donor compound to titanium in the brown solid of (b) ranging from about 0.5:1 to about 5:1, and heating at a temperature ranging from about 20° to about 80° C.; (d) treating the brown solid of (c) with a solution of at least one electron pair acceptor selected from the group consisting of titanium tetrahalides, titanium alkoxyhalides, aluminum bromide, germanium tetrachloride, silicon tetrachloride, and other Group IVA, IVB, and VB halides in an inert liquid at conditions of temperature, time, concentration of said acceptor in said liquid, and molar ratio of acceptor to titanium contained in said brown solid of (c) which are effective to convert said brown solid of (c) into a brown solid having a surface area of at least about 50 square meters per gram and a pore volume of at least about 0.10 cc per gram; and (e) recovering the brown solid of (d).

In the titanium tetrachloride reduction step (a) useful organoaluminum compounds include trihydrocarbylaluminums, and dihydrocarbylaluminum halides as well as mixtures thereof and mixtures with hydrocarbylaluminum dihalides. From the standpoint of catalytic activity and stereospecificity, preferred organoaluminum components are those wherein R in the formula $AlR_nX_{3-n}$ is an alkyl radical of 1 to about 8 carbon atoms, X is chlorine, and n ranges from about 1.5 to about 2. Specific examples include dimethylaluminum chloride, diethylaluminum chloride, ethylaluminum sesquichloride, diisobutylaluminum chloride, hexylaluminum sesquichloride, and dioctylaluminum chloride. The sesquichlorides are conveniently formed by mixing equimolar quantities of the appropriate mono- and dichlorides. Best results are attained through the use of diethylaluminum chloride, ethylaluminum sesquichloride, and mixtures of diethylaluminum chloride and ethylaluminum dichloride in amounts such that the molar ratio of total chlorine in the mixture to total aluminum in the mixture is greater than 1:1 but less than 1.5:1. The amount of organoaluminum compound employed in the reduction step varies depending upon the amount of titanium tetrachloride used. Usefully, the molar ratio of organoaluminum compound to titanium tetrachloride ranges from about 0.5:1 to about 3:1. At ratios below about 0.5:1 there is insufficient organoaluminum component to adequately reduce the amount of titanium tetrachloride, and ratios above about 3:1 are wasteful of the organoaluminum component. Molar ratios of about 0.5:1 to about 2:1 are preferred in the reduction step in order to avoid waste of either the titanium tetrachloride or the organoaluminum component.

The reduction step (a) is carried out at a temperature below 0° C., and preferably from about −30° to about 0° C. The time of the reduction ranges from several minutes to several hours with about ½ to about 3 hours being preferred. The reduction is carried out in the presence of an inert liquid hydrocarbon or halogenated hydrocarbon solvent for the titanium tetrachloride. Specific examples of useful solvents include alkanes such as pentane, hexane, cyclohexane, octane, and so forth, and halogenated aromatics such as chlorobenzene, and ortho-dichlorobenzene. For best results, the solvent should be purified prior to use such as by passage through molecular sieves and/or silica gel. The preferred solvent is hexane.

Following the reduction step, the resulting slurry of reduced brown solid is briefly heated at a temperature ranging up to about 100° C. and preferably up to about 80° C. The time of heating ranges from several minutes to several hours. As a result of the reduction and heating steps (a) and (b) there is obtained a brown solid containing beta titanium trichloride and small amounts of coprecipitated organoaluminum compounds. The solid preferably is separated from the solvent and washed to remove coprecipitated organoaluminum compounds. Thereafter, the brown solid is contacted in the presence of an inert liquid of the type employed as a solvent in the reduction step with at least one organic electron pair donor compound such as an ether, thioether, thiol, ketone, ester, amide, amine, phosphine, or stibine and heated at a temperature ranging from about ambient to about 80° C. Preferred organic electron donors are the ethers, thioethers, thiols, and ketones. More preferably, a dialkylether such as di-n-butyl, di-isobutyl, dicyclohexyl, diisoamyl, or dioctylether is employed. Best results are attained through the use of diisoamylether.

In general, the reactants in the electron pair donor complexing step (c) are added to the reduced solid from (b) at about ambient temperature and the result then is heated at a temperature ranging from about ambient to about 80° C. More preferably, the heating is conducted at a temperature ranging from about 30° to about 70° C. The time of heating suitably ranges from several minutes to several hours, with about ¼ to about 2 hours being preferred.

The amount of organic electron pair donor compound which is contacted with the reduced brown solid ranges from about 0.5 to about 5 moles per mole of titanium contained in the brown solid. Best results are attained when this ratio ranges from about 0.75:1 to about 2:1.

Following complexing with the organic electron pair donor, the resulting solid preferably is separated from the reaction medium and washed to remove unreacted electron pair donor.

The brown solid resulting from the complexing with at least one electron pair donor is essentially a low surface area form of beta titanium trichloride containing small amounts of organoaluminum compounds and an amount of electron pair donor. This product is treated with a solution of at least one electron pair acceptor compound in an inert solvent of the type employed in the reduction step under conditions which are effective to convert the low surface area brown solid resulting from the electron pair donor complexing step to a high surface area brown solid.

Useful electron pair acceptors include titanium tetrahalides, titanium alkoxyhalides, aluminum bromide, germanium tetrachloride, silicon tetrachloride, and other Group IVA, IVB, and VA halides. Preferred electron pair acceptors are titanium tetrachloride, germanium tetrachloride, and silicon tetrachloride, best results being attained through the use of titanium tetrachloride.

The electron pair acceptor is used in an amount such that the molar ratio of acceptor to titanium in the brown solid resulting from the electron donor complexing step ranges from about 0.5:1 to about 10:1. Most preferably this ratio ranges from about 1:1 to about 3:1 so that the electron pair acceptor treatment can be accomplished at economical rates and without the need for removal of excessive amounts of unreacted electron pair acceptor.

The electron pair acceptor is used in the form of a solution in an inert solvent of the type used as a solvent in the titanium tetrachloride reduction step (a). Preferably, the concentration of acceptor in solvent ranges from about 5 to about 30 wt. %.

The electron pair acceptor treatment is conducted at a temperature ranging from about ambient up to a maximum which varies somewhat depending on the choice of organoaluminum component used in the reduction step (a) and the concentration of acceptor in solvent. When the reductant is a material having a halogen to aluminum ratio of about 1:1 or less, e.g. a dihydrocarbylaluminum halide, trihydrocarbylaluminum, and mixtures thereof, the maximum temperature in the acceptor treatment is preferably about 100° C. with about 80° C. being more preferred. When the reductant in (a) is a material having a halogen to aluminum ratio greater than about 1:1, e.g., mixtures of hydrocarbylaluminum dihalides with dihydrocarbylaluminum halides, there is an increased tendency toward conversion of the brown solid to a purple material if the acceptor treatment is conducted at too high a temperature. When the halogen to aluminum ratio in the reductant is at least about 1.5:1, e.g. the reductant is a hydrocarbylaluminum sesquihalide or a mixture of mono- and dihalides wherein the amount of the latter exceeds that of the former, a maximum temperature of about 70° C. is preferred in the acceptor treatment step with about 65° C. being more preferred. When the reductant in (a) has a halogen to aluminum ratio greater than about 1:1 but less than about 1.5:1, the maximum temperature which is preferred in the acceptor treatment step falls within the range of about 70° to about 100° C. and can be determined by routine experimentation. The effect of acceptor concentration in the solvent on maximum acceptor treatment temperature is such that at concentrations in the lower end of the aforesaid concentration range (about 5 to about 30 volume %) temperatures in the upper end of the aforesaid ranges can be employed. At higher concentrations, lower temperatures are employed to avoid substantial conversion of the brown solid to a purple material. The time of the electron pair acceptor treatment generally ranges from several minutes to several hours, and preferably, from about ¼ to about 5 hours, with shorter treatment times allowing for higher temperatures and/or acceptor concentrations, and longer treatment times requiring lower temperatures and/or concentrations in order to avoid substantial conversion of the brown solid to a purple material.

Subsequent to either the electron pair donor complexing step (c) or, preferably, the electron pair acceptor treatment step (d) it is contemplated to conduct one or more additional electron pair donor complexing steps if desired. Although not required, such additional step or steps serve to improve the alpha-olefin polymerization performance of the ultimate brown solid catalyst component in terms of stereospecificity while substantially maintaining activity.

The one or more additional electron pair donor complexing steps are conducted in the presence of an inert liquid of the type used as a solvent in the reduction step and at a temperature of about 10° to about 45° C. At temperatures below about 10° C. reaction proceeds at an undesirably slow rate. At temperatures above about 45° C., the stereospecificity-improving effect of the additional complexing step or steps is substantially diminished. Preferably, in order to achieve maximum effect in terms of stereospecificity improvement at economical rates, the one or more additional complexing steps are conducted at about 15° to about 35° C., and more preferably, at about 20° to about 30° C. The time of such additional step or steps is not critical and can range from several minutes to several hours.

Electron pair donors useful in the one or more additional complexing steps are selected from the group consisting of carboxylic acid esters, amines, organic borates, coordinating cyclic hydrocarbons having at least one double bond, and mixtures thereof. Specific examples of these include ethyl benzoate, ethyl anisate, methyl-p-toluate, tetramethylpyrazine, triethylamine, tributylamine, 2,4,6-collidine, trimethyl borate, tributyl borate, cycloheptatriene, and cyclooctatriene. If more than one additional electron pair donor complexing steps are conducted the same or different electron donors can be used in the individual steps. The amount of electron pair donor employed in the one or more additional complexing steps varies depending on the choice of donor as well as the amount of titanium contained in the brown solid to be treated, and, in general, is an amount which is effective to improve the polymerization performance of the final brown solid catalyst component in terms of stereospecificity without substantially decreasing catalytic activity. Preferred molar ratios of donor to titanium are as set forth hereinabove in connection with the electron donor incorporation step (c).

Following the electron pair acceptor treatment step (d) or any subsequent additional electron pair donor complexing steps, the resultant brown solid is recovered and preferably washed with a material capable of removing unreacted electron pair acceptor and/or donor. The resulting brown solid comprises titanium trichloride of the beta crystalline form and an amount, ranging up to about 10 mole %, of at least one electron pair donor, and has a BET surface area of at least about 50 square meters per gram and a pore volume of at least about 0.10 cc. per gram. Further details with respect to the preparation and composition of organoaluminum reduced, electron donor complexed, brown solid, beta titanium trichloride are found in U.S. Pat. Nos. 3,984,350 and 4,111,836, and application Ser. No. 892,663, all of which are incorporated herein by reference.

According to the improved method of the present invention organoaluminum reduced, electron donor complexed, brown solid, beta titanium trichloride catalyst component prepared as described above is contacted prior to polymerization with at least one aluminum alkyl component and at least one alpha-olefin in amounts and under conditions such that a low yield polyalpha-olefin structure is formed around the brown solid.

In greater detail, the brown solid, beta titanium trichloride composition, aluminum alkyl component and alpha-olefin are contacted at a temperature ranging from about 0° to about 40° C. At temperatures below about 0° C. reaction proceeds at unreasonably slow rates. Temperatures above about 40° C. adversely affect the brown solid in terms of polymerization activity and stereospecificity. To ensure economic reaction rates while maintaining maximum polymerization effectiveness, the alpha-olefin and aluminum alkyl pretreatment temperature preferably ranges from about 10° to about 35° C. Within this range, temperatures of about ambient are most preferred for the sake of convenience.

Generally, the amount of aluminum alkyl employed according to this invention is at least a catalytically effective amount and can be readily determined by persons of skill in the art. Preferably, the molar ratio of aluminum alkyl to titanium contained in the brown solid catalyst component ranges from about 2:1 to about 10:1. However, substantially greater amounts of aluminum alkyl can be used if desired and often give beneficial results due to scavenging of impurities which may be contained in the pretreatment system.

During the alpha-olefin and aluminum alkyl pretreatment, the alpha-olefin is employed at a rate of about 0.05 to about 10 grams per gram of brown solid per hour. Slower feed rates lead to unreasonably long reaction rates, and at higher feed rates polymerization rates are so high as to lead to evolution of heat in amounts capable of adversely affecting the brown solid in terms of polymerization performance. Preferred alpha-olefin feed rates range from about 0.1 to about 1 gram per gram brown solid per hour.

The time of the alpha-olefin and aluminum alkyl treatment varies depending on the alpha-olefin feed rate, temperature, and amount of brown solid to be treated, and is sufficiently long that from about 0.005 to about 100 grams polyalpha-olefin are formed per gram of brown solid. Preferably, from about 0.01 to about 5 grams polyalpha-olefin are formed per gram of brown solid as these amounts provide suitable resistance to attrition and agglomerate formation while avoiding dilution of the brown solid catalyst component with amounts of polymer which are large enough to lead to disadvantages in terms of storage and handling of the encapsulated brown solid. Preferably, the time of the treatment ranges from about ½ to several hours, and more preferably, from about 2 to about 15 hours. Alpha-olefin can be fed during the entire treatment period or, if desired, alpha-olefin can be charged at the start of the treatment and then discontinued or charged intermittantly therefter. If desired, hydrogen also can be charged to the pretreatment system. Preferably, the brown solid, aluminum alkyl component, and alpha-olefin are agitated during treatment to ensure adequate contact of the materials.

The brown solid, aluminum alkyl, and alpha-olefin are contacted in the presence of an inert liquid diluent and in the substantial absence of extraneous catalyst poisons such as water, oxygen, carbon oxides, and polar compounds. Such materials are conveniently excluded by carrying out the treatment under an atmosphere of an inert gas such as nitrogen or argon. It also is helpful in this regard to purify the alpha-olefin and diluent to be employed such as by passage through molecular sieves and/or silica gel. As noted hereinabove, the use of excess aluminum alkyl also is helpful in rendering impurities harmless.

Useful diluents include various hydrocarbons and halogenated derivatives thereof such as are commonly employed as polymerization diluents in slurry polymerization operations. Specific examples of useful diluents include alkanes such as hexane, octane, nonane, and the like, aromatics such as ethylbenzene, diethylbenzenes, and toluene, and halogenated and hydrogenated aromatics such as chlorobenzene, o-dichlorobenzene, and tetrahydronaphthalene. The preferred diluent for use according to this invention is hexane.

Aluminum alkyl components employed in the aluminum alkyl and alpha-olefin pretreatment of the brown solid catalyst component are compounds of the formula $AlR'_m X_{3-m}$ wherein $R'$ is an alkyl radical of 1 to about 20 carbon atoms, X is halogen, and m ranges from 1 to 3. Mixtures of aluminum alkyls can be employed if desired. Preferred aluminum alkyls are those wherein $R'$ in the formula is an alkyl radical of 2 to 8 carbon atoms, X is chlorine, and m ranges from 2 to 3. Specific examples of preferred aluminum alkyls include triethylaluminum, diethylaluminum chloride, triisobutylaluminum, diisobutylaluminum chloride, and tri-n-hexyl aluminum. Best results are attained through the use of diethylaluminum chloride.

Alpha-olefins useful in the aluminum alkyl and alpha-olefin pretreatment of the brown solid titanium trichloride catalyst component are materials of the formula $RCH=CH_2$ wherein R is hydrogen or an alkyl radical of 1 to about 8 carbon atoms. Mixtures of alpha-olefins also can be employed if desired. Examples of useful alpha-olefins include ethylene, propylene, butene-1, pentene-1, 4-methylpentene-1, hexene-1, and so forth. As the brown solid catalyst component obtained in accordance with this invention is best suited for use in the polymerization of propylene and copolymerization of propylene-dominated mixtures of alpha-olefins, the alpha-olefin which is preferred for use in the alpha-olefin and aluminum alkyl pretreatment of the brown solid is propylene. For best results, it is desirable to employ polymerization grade alpha-olefin and to purify the same prior to use.

During the aluminum alkyl and alpha-olefin pretreatment of the brown solid, beta titanium trichloride catalyst component it also is contemplated to include one or more compounds of the type conventionally employed in the polymerization of alpha-olefins to improve polymer crystallinity. Useful materials include various organic compounds containing oxygen, nitrogen, phosphorus, and/or sulfur such as various ethers, carboxylic acid esters, ketones, amines, amides, phosphites, thiophosphites, thiols, and other organic electron donors, as well as various oxides and oxyacids of sulfur, hydrogen sulfide, and organometallic sulfides, and combinations thereof. The amount of crystallinity promoting component to be employed varies depending on the choice of component as well as the amount of brown solid, beta titanium trichloride composition employed in the aluminum alkyl and alpha-olefin pretreatment. Generally, the amount of crystallinity promoting component used is an amount which is effective to improve the brown solid in terms of stereospecificity without substantially decreasing the polymerization activity thereof. Preferably, from about 0.001 to about 0.5 mole of crystallinity promoting component is used per mole of titanium contained in the brown solid titanium trichloride composition. Further details with respect to various crystallinity promoting components and effective amounts thereof are found in the examples appearing hereinafter and U.S. Pat. Nos. 3,984,350; 4,111,836; 4,072,809 (Rogan); 3,950,268 (Karayannis et al.); and application Ser. No. 892,663.

As a result of the above-described aluminum alkyl and alpha-olefin pretreatment of the brown solid, beta titanium trichloride catalyst component there is obtained a slurry of low yield polyalpha-olefin-encapsulated brown solid catalyst component in the pretreatment diluent. For use in the polymerization of alpha-olefins, the slurry can be used as is or the encapsulated brown solid can be separated from the diluent prior to use. The polyalpha-olefin structure serves to protect the brown solid from attrition during catalyst makeup and pumping operations and during polymerization, and in addition, the low yield polyalpha-olefin structure serves to lower initial catalytic activity such that in polymerization systems wherein catalyst contacts undiluted alpha-olefin monomer on introduction into a polymerization zone, violent, exothermic polymerization and agglomerate formation are reduced.

For use in the polymerization of alpha-olefins, the above-described, low yield polyalpha-olefin encapsulated brown solid titanium trichloride catalyst component is combined with at least one organoaluminum compound of the type conventionally employed as alpha-olefin polymerization catalyst component and, if desired, at least one crystallinity promoting additive, and contacted with at least one alpha-olefin under polymerization conditions. Further details with respect to polymerization use and conditions are found in the examples appearing hereinafter and in U.S. Pat. Nos. 3,984,350, 4,111,836, and application Ser. No. 892,663.

The present invention is further described in the following examples, it being understood that the same are for purposes of illustration and not limitation.

GENERAL EXPERIMENTAL PROCEDURE

In each of the examples, the organoaluminum reduced, electron donor complexed, brown solid, beta titanium trichloride catalyst component employed was prepared according to the following procedure. Into a 100 gallon (378.54 liter) glass lined, jacketed Pfaudler kettle equipped with nitrogen inlet, agitator shaft and impellor were added 44 parts by weight dried hexane followed by 44 parts by weight titanium tetrachloride at ambient temperature. The reactor then was cooled to about $-2-0°$ C., the contents agitated at 100 rpm, and addition of ethylaluminum sesquichloride (EASC) begun. The EASC was used in the form of a 25 wt.% solution in hexane and was added at a rate of about 0.7 parts by weight per minute. A total of 225 parts EASC solution were added over a period of $5\frac{1}{3}$ hours. Following completion of the EASC addition, agitation was continued for an additional fifteen minutes and then, with continued agitation, the reactor was heated to 60°-61° C. over a period of about one hour and this temperature was maintained for an additional hour. The reactor then was cooled to about 49° C. over a period of 20 minutes, agitation was discontinued, and solids were allowed to settle for about 10 minutes. Subsequently, supernatant liquid was decanted and the remaining brown mud was washed three times with dried hexane. In each wash, approximately 116 parts by weight hexane were added to the brown mud at about 20° to 30° C., and the mixture was agitated at 75 rpm for 15 minutes, after which solids were allowed to settle for 10 minutes and supernatant liquid was decanted.

Subsequently, approximately 198 parts by weight dried hexane were added to the brown mud at ambient temperature and the mixture was agitated at 75 rpm and about 20° to 30° C. Addition of diisoamyl ether at a rate of about 4 parts by weight per minute was begun and continued until a total of 41 parts had been added. The reactor then was heated to 35° C. over a period of about 20 minutes and this temperature was maintained for 1 hour. Agitation then was discontinued and solids allowed to settle for 10 minutes, after which the supernatant liquid was decanted. The remaining brown mud then was washed 3 times in the manner described above.

To the resultant brown mud were added 77 parts by weight dried hexane at ambient temperature and the resulting mixture was agitated at 75 rpm and about 20° to 30° C. Addition of titanium tetrachloride at a rate of about 10 parts by weight per minute then was begun and continued until a total of 51 parts had been added. The reactor then was heated to about 60°-62° C. over a period of 1 hour and this temperature was maintained for an additional hour. After heating, the reactor was cooled to about 49° C. over a period of 20 minutes, agitation was discontinued, solids were allowed to settle for 10 minutes, and the supernatant liquid was decanted. The remaining brown mud then was washed 3 times according to the procedure described above after which supernatant liquid was removed and the brown solid was suspended in dried hexane and the suspension removed from the reactor for storage.

As a result of the above-described preparation there were obtained about 42-43 parts by weight of a brown solid catalyst component containing about 88 wt. % beta titanium trichloride, about 10 wt. % diisoamyl ether, and minor amounts of aluminum and residual hexane. The brown solid had a BET surface area of 140 m$^2$/g., a pore volume greater than 0.1 cc/g, and an average particle size of 25 microns.

In the examples, all polymerization runs were conducted in a 1 gallon, agitated Pfaudler reactor equipped with a thermocouple according to the following procedure. 1200 ml. hexane were added to the reactor which was then sealed and heated to 68.3° C. 4 ml. catalyst slurry then were syringed into the reactor. Hydrogen and propylene then were charged, the former at 6 psi and the latter as necessary to maintain a total reactor pressure of 160 psig at the start and throughout the run. After two hours, polymerization was terminated by addition of methanol, the reactor was emptied, the contents filtered, and the resulting solid polypropylene was dried overnight in a vacuum oven at 60° C. and under nitrogen. Polymer yield was determined by weighing the dried polypropylene. Particle size distribution was determined by placing a 10 g. sample of polymer on a standard series of sieves, shaking for 10 minutes, and weighing the amount retained on each sieve. Bulk density was determined by weighing a 10 ml. sample of the dried polypropylene.

REFERENCE EXAMPLE A

To a 4 oz. glass bottle in a nitrogen filled drybox at ambient temperature were added 66.0 ml. mineral oil (Nujol, obtained from Plough, Inc.), followed by 2.5 g. brown solid catalyst component, 33.5 ml. of a 24.4 wt.% solution of diethylaluminum chloride (DEAC) in hexane, 0.25 ml. bis(tributyltin)sulfide (BTS), and then 0.13 ml. 2,4,6-collidine (COLL). The mineral oil was used to aid in mixing the catalyst components and handling the final catalyst mix. BTS and COLL are crystallinity promoting additives. The mixture was stirred during addition of the components and for about 10 minutes thereafter. Subsequently a 4 ml. sample of the slurry was used for polymerization. Polymerization results are reported in TABLE I.

REFERENCE EXAMPLE B

A catalyst mix was prepared from 7.0 g. brown solid catalyst component, 93.8 ml. of 24.4 wt.% DEAC in hexane, 0.7 ml. BTS, 0.36 ml. COLL, and 105.0 ml. hexane according to the procedure of REFERENCE EXAMPLE A.

To simulate the attrition which occurs in commercial scale catalyst make-up, pumping, and polymerization, the catalyst mix was transferred to a Sargent Welch, single speed waring blender in a nitrogen filled drybox and the blender was switched on for 15 seconds and then off for 5 minutes to cool the catalyst mix. The 15 second attrition-5 minute cooling cycle was repeated until the total attrition time was 5 minutes. Subsequently, the contents of the blender were transferred to a glass bottle in the drybox and solids were allowed to settle. After settling, the supernatent liquid was syringed out of the jar and 93.8 ml. of 24.4 wt.% DEAC in hexane were added. The total volume of the catalyst mix then was made up to 280 ml. with Nujol and a 4 ml. sample of the result was used for polymerization. Results are reported in TABLE I.

EXAMPLE I

A mixture of brown solid, DEAC, BTS, COLL, and hexane prepared as in REFERENCE EXAMPLE B (first paragraph) was transferred to an agitated 450 ml. stainless steel vessel in the drybox after which the vessel was closed and the contents agitated. Propylene at ambient temperature and atmospheric pressure was metered into the vessel at a rate of 30.6 ml./minute (0.4 g. propylene per g. brown solid per hour). After 5 hours, the propylene feed was discontinued and the contents of the vessel were agitated for an additional 7 hours. The resulting polypropylene encapsulated catalyst component then was allowed to settle and the supernatent liquid syringed out. After addition of 93.8 ml. 24.4 wt. % DEAC in hexane, total catalyst volume was made up to 280 ml. with Nujol and a 4 ml. sample of the result was used for polymerization. Results are reported in TABLE I.

EXAMPLE II

The procedure of EXAMPLE I was repeated except that after agitation was discontinued, the resulting slurry of encapsulated catalyst component in hexane was attrited according to the procedure of REFERENCE EXAMPLE B. 4 ml. of the result was used for polymerization. Results are reported in TABLE I.

TABLE I

| EXAMPLE | A | B | I | II |
|---|---|---|---|---|
| PREPOLYMERIZATION YIELD* | 0 | 0 | 2.2 | 2.3 |
| ATTRITION | No | Yes | No | Yes |
| POLYMERIZATION YIELD* | 2610 | 2510 | 2250 | 2400 |
| BULK DENSITY** | 21.2 | 11.5 | 29.1 | 25.5 |
| PARTICLE SIZE DISTRIBUTION*** | | | | |
| 16 | 10.2 | 1.5 | 0 | 0.5 |
| 20 | 2.5 | 0.9 | 0.1 | 0.3 |
| 30 | 3.0 | 1.5 | 0.2 | 0.6 |
| 50 | 76.7 | 45.2 | 89.4 | 77.5 |
| 100 | 4.2 | 20.8 | 6.7 | 9.4 |
| 200 | 1.6 | 13.2 | 2.0 | 2.8 |
| 325 | 0.8 | 7.7 | 0.1 | 0.4 |
| PAN | 0.9 | 9.1 | 1.6 | 8.4 |

*g. polypropylene per g. brown solid catalyst component.
**lb./ft.$^3$
***wt. % of sample retained on a screen of the specified mesh.

From the standpoint of polymer handling and processing, a desirable particle size range is from about 16 to 50 mesh. As can be seen from the foregoing examples and TABLE I, 92.4 wt. % of the product obtained in REFERENCE EXAMPLE A, using unattrited catalyst, had a particle size ranging from 16 to 50 mesh. However, when the catalyst was attrited (REFERENCE EXAMPLE B), the fraction of product having the desired particle size dropped to 49.1 wt. %. With respect to the polypropylene encapsulated catalysts, the unattrited sample (EXAMPLE I) was essentially the same as REFERENCE EXAMPLE A in terms of particle size (89.7 wt. % between 16 and 50 mesh) and even when the catalyst was attrited (EXAMPLE II), the fraction within the desired range was high (78.9 wt. %).

Propylene and aluminum alkyl pretreatment also had a beneficial effect on polymer bulk density as can be seen from the examples and TABLE I. Attrition of the unpretreated catalyst component resulted in a substantial decrease in bulk density (21.2 lb./ft.$^3$ in REFERENCE EXAMPLE A vs. 11.5 lb./ft.$^3$ in REFERENCE EXAMPLE B). However, only a minor decrease resulted from attrition of the pretreated catalyst component (29.1 lb./ft.$^3$ in EXAMPLE I vs. 25.5 lb./ft.$^3$ in EXAMPLE II), and the bulk density of the product obtained using the attrited, pretreated catalyst component (EXAMPLE II) was greater than that in the run using unattrited, unpretreated catalyst component (REFERENCE EXAMPLE A).

From the yields reported in the table it also can be observed that the above-described beneficial effects on particle size and bulk density were achieved with only slight effects on catalytic activity.

As a means for study the effects of propylene and aluminum alkyl pretreatment on initial polymerization activity, reactor temperature was monitored prior to and during the polymerization runs of REFERENCE EXAMPLE B and EXAMPLE II. Results are reported in TABLE II.

TABLE II

| EXAMPLE | B | II |
|---|---|---|
| TEMPERATURE (°C.): | | |
| (1) Prior to catalyst addition | 68.3 | 68.3 |
| (2) After catalyst addition | 72.2 | 69.4 |
| (3) Lined out | 71.1 | 71.1 |
| YIELD (g. polypropylene/ g. brown solid catalyst component) | 2510 | 2400 |

As can be seen from the table, addition of unpretreated catalyst in B resulted in a temperature increase of almost 4° C. as compared to an increase of 1.1° C. in II. The temperature increase in B is indicative of a violent, exothermic initial reaction while that in II indicates a slower initial reaction. Comparison of the yields for the two runs indicates that the beneficial effects of pretreatment on initial activity are attained without substantial decreases in overall polymerization activity.

I claim:

1. In a process for preparing a brown solid catalyst component comprising beta titanium trichloride and an amount, ranging up to about 10 mole %, of at least one organic electron pair donor compound selected from the group consisting of hydrocarbyl ethers, thioethers, thiols, ketones, esters, amides, amines, phosphines and stibines, said brown solid having a surface area of at least about 50 square meters per gram and a pore volume of at least about 0.10 cc per gram and produced by a process comprising:
   (a) reacting titanium tetrachloride and at least one organoaluminum component of the formula $AlR_nX_{3-n}$ wherein R is a hydrocarbyl radical, X is chlorine or bromine, and $1 < n \leq 3$ in amounts such that the molar ratio of said organoaluminum component to titanium tetrachloride ranges from about 0.5:1 to about 3:1 and at a temperature below about 0° C. in the presence of an inert liquid solvent for said titanium tetrachloride to form a brown solid;
   (b) increasing the temperature of the brown solid of (a) to less than about 100° C.;
   (c) contacting the brown solid of (b) with at least one electron pair donor compound selected from the group consisting of hydrocarbyl ethers, thioethers, thiols, ketones, esters, amides, amines, phosphines and stibines in the presence of an inert liquid solvent for said donor compound, the molar ratio of said donor compound to titanium in the brown solid of (b) ranging from about 0.5:1 to about 5:1, and heating at about ambient to about 80° C.;
   (d) treating the brown solid of (c) with a solution of at least one electron pair acceptor selected from the group consisting of titanium tetrahalides, titanium alkoxyhalides, aluminum bromide, germanium tetrachloride, silicon tetrachloride, and other Group IVA, IVB, and VB halides in an inert liquid at conditions of temperature, time, concentration of said acceptor in said liquid, and molar ratio of said acceptor to titanium contained in said brown solid of (c) which convert said brown solid of (c) into a brown solid having a surface area of above about 50 square meters per gram and a pore volume of above about 0.10 cc per gram; and
   (e) recovering the solid of (d); the improvement wherein
   (f) the brown solid from (e) is contacted in the presence of an inert liquid diluent and at a temperature ranging from about 0° to about 40° C. with at least a catalytically effective amount of at least one aluminum alkyl component of the formula $AlR'_mX_{3-m}$ wherein R' is an alkyl radical of 1 to about 20 carbon atoms, X is halogen, and m ranges from 1 to 3, and at least one alpha-olefin at a rate of about 0.05 to about 10 grams alpha-olefin per gram of said brown solid from (e) per hour for a time sufficient to form about 0.005 to about 100 grams solid polyalpha-olefin per gram of said brown solid from (e).

2. The process of claim 1 wherein the organoaluminum component in (a) is a trialkylaluminum, a dialkylaluminum chloride, a mixture thereof, or a mixture of a dialkylaluminum chloride with an alkylaluminum dichloride in amounts such that the total chlorine to aluminum molar ratio is greater than 1 and no greater than about 1.5, each of said alkyl radicals containing 1 to about 8 carbon atoms.

3. The process of claim 2 wherein the electron pair donor compound in (c) is diisoamyl ether.

4. The process of claim 1 wherein the electron pair donor compound in (c) is a dialkyl ether.

5. The process of claim 4 wherein the organoaluminum component in (a) is diethylaluminum chloride or ethylaluminum sesquichloride.

6. The process of claim 1 wherein the electron pair acceptor in (d) is titanium tetrachloride.

7. The process of claim 6 wherein the organoaluminum component in (a) is diethylaluminum chloride or ethylaluminum sesquichloride and the electron pair donor compound in (b) is diisoamyl ether.

8. The process of claim 7 wherein the alpha-olefin in (f) is propylene.

9. The process of claim 8 wherein the aluminum alkyl component in (f) is diethylaluminum chloride.

10. The process of claim 1 wherein the alpha-olefin in (f) is propylene.

11. The process of claim 10 wherein the aluminum alkyl in (f) is diethylaluminum chloride.

12. The low yield-polypropylene-encapsulated brown solid catalyst component obtained according to the process of claim 11.

13. The low yield-polyalpha-olefin-encapsulated brown solid catalyst component obtained according to the process of claim 1.

14. A process for improving the alpha-olefin polymerization performance of organoaluminum reduced, electron donor complexed, brown solid, beta titanium trichloride catalyst component in terms of polymer particle size and decreasing the initial polymerization activity of said component without substantially decreasing overall polymerization activity comprising contacting said brown solid in the presence of an inert liquid diluent and at a temperature ranging from about 0° to about 40° C. with at least a catalytically effective amount of at least one aluminum alkyl component of the formula $AlR'_m X_{3-m}$ wherein $R'$ is an alkyl radical of 1 to about 20 carbon atoms, X is halogen, and m ranges from 1 to 3, and at least one alpha-olefin at a rate of about 0.05 to about 10 grams alpha-olefin per gram of brown solid per hour for a time sufficient to form about 0.005 to about 100 grams solid polyalpha-olefin per gram of said brown solid.

15. The process of claim 14 wherein the aluminum alkyl component is a dialkylaluminum chloride containing 2 to about 8 carbon atoms per alkyl radical.

16. The process of claim 15 wherein the alpha-olefin is propylene.

17. The process of claim 16 wherein the dialkylaluminum chloride is diethylaluminum chloride.

18. The process of claim 17 wherein the temperature ranges from about 10° to about 35° C.

19. The low yield-polypropylene-encapsulated brown solid catalyst component obtained according to the process of claim 18.

20. The low yield-polyalpha-olefin-encapsulated brown solid catalyst component obtained according to the process of claim 14.

21. The process of claim 14 further characterized in that said brown solid, aluminum alkyl component, and alpha-olefin are contacted in the presence of at least one crystallinity promoting component which is present in an amount which is effective to improve the polymerization performance of said brown solid in terms of stereospecificity without substantial decreases in activity.

22. The process of claim 21 wherein the alpha-olefin is propylene and the aluminum alkyl component is a dialkylaluminum chloride containing 2 to about 8 carbon atoms per alkyl radical.

23. The process of claim 22 wherein the dialkylaluminum chloride is diethylaluminum chloride.

24. The process of claim 23 wherein the temperature ranges from about 10° to about 35° C.

25. The low yield-polypropylene-encapsulated brown solid catalyst component obtained according to the process of claim 24.

26. The low yield-polyalpha-olefin-encapsulated brown solid catalyst component obtained according to the process of claim 21.

* * * * *

UNITED STATES PATENT AND TRADEMARK OFFICE
CERTIFICATE OF CORRECTION

PATENT NO. : 4,235,747
DATED : Nov. 25, 1980
INVENTOR(S) : Linus K. Leung

It is certified that error appears in the above—identified patent and that said Letters Patent is hereby corrected as shown below:

| Patent Column | Line | |
|---|---|---|
| Abstract | 7 | "polyalphaolefin" should be --polyalpha-olefin-- |
| 2 | 11 | "polyalphaolefin" should be --polyalpha-olefin-- |
| 2 | 24 | "to skill" should be --of skill-- |
| 2 | 59 | "titanium trichloride" should be --titanium tetrachloride-- |
| 2 | 64 | "with 10 hours" should be --within 10 hours-- |
| 8 | 66 | "therefter" should be --thereafter-- |
| 13 | 53 | "study" should be --studying-- |

Signed and Sealed this

Seventh Day of April 1981

[SEAL]

Attest:

RENE D. TEGTMEYER

Attesting Officer

Acting Commissioner of Patents and Trademarks